(12) United States Patent
Mahindra et al.

(10) Patent No.: US 8,874,125 B2
(45) Date of Patent: Oct. 28, 2014

(54) RADIO ACCESS NETWORK SHARING

(71) Applicant: NEC Laboratories America, Inc., Princeton, NJ (US)

(72) Inventors: Rajesh Mahindra, Highland Park, NJ (US); Mohammad A. Khojastepour, Lawrenceville, NJ (US); Sampath Rangarajan, Bridgewater, NJ (US); Honghai Zhang, Seattle, WA (US)

(73) Assignee: NEC Laboratories America, Inc., Princeton, NJ (US)

( * ) Notice: Subject to any disclaimer, the term of this patent is extended or adjusted under 35 U.S.C. 154(b) by 14 days.

(21) Appl. No.: 13/787,985

(22) Filed: Mar. 7, 2013

(65) Prior Publication Data

US 2013/0237239 A1 Sep. 12, 2013

Related U.S. Application Data

(60) Provisional application No. 61/608,377, filed on Mar. 8, 2012, provisional application No. 61/758,986, filed on Jan. 31, 2013.

(51) Int. Cl.
*H04W 72/00* (2009.01)
*H04W 16/14* (2009.01)
*H04W 16/10* (2009.01)

(52) U.S. Cl.
CPC ............. *H04W 16/14* (2013.01); *H04W 16/10* (2013.01)
USPC .................. 455/452.1; 370/329; 455/423

(58) Field of Classification Search
CPC ........... H04W 72/04; H04W 72/0406; H04W 72/0433; H04W 72/0486
USPC .......... 455/450–454; 370/328–329, 431, 437, 370/465, 468; 703/3, 4, 13, 17, 21, 22
See application file for complete search history.

(56) References Cited

U.S. PATENT DOCUMENTS

| | | | |
|---|---|---|---|
| 8,190,409 B2 * | 5/2012 | Barbaresi et al. | 703/6 |
| 2009/0203383 A1 * | 8/2009 | Shen et al. | 455/450 |
| 2013/0183991 A1 * | 7/2013 | Bosch et al. | 455/450 |

OTHER PUBLICATIONS

R. Kokku, R. Mahindra, H. Zhang, and S. Rangarajan. NVS: A Substrate for Virtualizing WiMAX Networks. In ACM MobiCom., Sep. 2010.
G. Bhanage, R. Daya, I. Seskar, and D. Raychaudhuri. VNTS: A Virtual Network Traffic Shaper for Air Time Fairness in 802.16e. In ICC, 2010.
L. Zhao, M. Li, Y.Zaki, Timm-Giel, and C. Gorg. LTE Virtualization: From theoretical gain to practical solution In ITC, 2011.
U. Paul, A.P. Subramanian, M. Buddhikot, and S.R. Das. Understanding Traffic Dynamics in Cellular Data Networks. In IEEE Infocom, 2011.

* cited by examiner

*Primary Examiner* — Rafael Pérez-Gutiérrez
*Assistant Examiner* — Juan C. Pérez Tolentino
(74) *Attorney, Agent, or Firm* — Joseph Kolodka

(57) ABSTRACT

A method implemented in an apparatus used in a radio access network (RAN) sharing system including a plurality of basestations is disclosed. The method includes estimating resource requirement or demand of one or more entities in each base station according to feedback from the plurality of basestations, computing resource allocation for said one or more entities, and enforcing the computed resource allocation using basestation-level virtualization. Other methods, apparatuses, and systems also are disclosed.

19 Claims, 25 Drawing Sheets

(a) Alloc. Convergence  (b) Entity Res. Util.

(a) Alloc. Convergence  (b) Entity Res. Util.

① Acknowledgment for successful Client Association.

② Set-up Downlink and Uplink Flows for the Client on receiving ①.

③ Send Client's Flow and Entity information after sending ②.

④ Configure per-Entity Resource Reservation on the Basestation.

RADIO ACCESS NETWORK SHARING

This application claims the benefit of U.S. Provisional Application No. 61/608,377, entitled "Network-Wide Active RAN Sharing in Cellular Networks," filed on Mar. 8, 2012, and U.S. Provisional Application No. 61/758,986, entitled "Radio Access Network Sharing in Cellular Networks," filed on Jan. 31, 2013, the contents of both of which are incorporated herein by reference.

BACKGROUND OF THE INVENTION

The present invention relates to radio access network (RAN) sharing and more particularly to active RAN sharing.

The technology disclosed in this document, hereinafter called NetShare, aims to provide an effective RAN (radio access network) sharing technique for spectrum-sharing among several entities on cellular networks. We use the term entities to generally refer to mobile network operators (MNOs) that share the network, mobile virtual network operators (MVNOs), content providers, enterprises etc. Specifically, we focus on the problem of managing wireless resources across multiple basestations among multiple entities sharing the network. NetShare allows different entities to reserve aggregate resources on the cellular network.

NetShare ensures that an entity receives this reserved fraction of the wireless resources across a set of basestations in the cellular network.

In recent years, there have been a few efforts on wireless resource virtualization [1, 2, 3] that enforce resource reservations on every basestation (BS) independently. However, we believe that provisioning aggregate resources to the different entities across multiple basestations is an essential requirement for effective RAN sharing for the following reasons:

(1) The user distribution, average user channel conditions and user-traffic requirements of an entity may vary significantly across basestations even at fine-time scales. Hence, enforcing per-basestation resource reservation may not meet the requirements of an entity from a network perspective.

(2) It may be harder for entities to estimate average resource requirements on a per-basestation level as it varies over time and area [4]. Defining the resource requirement either over a specific geographical area that is potentially covered by several basestations, or based on the architectural hierarchy—for example, all basestations controlled by a specific network gateway—would be a realistic alternative.

No known solution has considered the problem of sharing resources across multiple base stations for several entities as we do in this work. NVS [1], VBTS [2] and LTEvirt [3] attempt to share resource on each individual base station.
[1] R. Kokku, R. Mahindra, H. Zhang, and S. Rangarajan. NVS: A Substrate for Virtualizing WiMAX Networks. In ACM MobiCom., September 2010.
[2] G. Bhanage, R. Daya, I. Seskar, and D. Raychaudhuri. VNTS: A Virtual Network Traffic Shaper for Air Time Fairness in 802.16e. In ICC, 2010.
[3] L. Zhao, M. Li, Y. Zaki, Timm-Giel, and C. Gorg. LTE Virtualization: From theoretical gain to practical solution In ITC, 2011.
[4] U. Paul, A. P. Subramanian, M. Buddhikot, and S. R. Das. Understanding Traffic Dynamics in Cellular Data Networks. In IEEE Infocom, 2011.

BRIEF SUMMARY OF THE INVENTION

An objective of the present invention is to share resources across multiple base stations for several entities.

An aspect of the present invention includes a method implemented in an apparatus used in a radio access network (RAN) sharing system including a plurality of basestations. The method comprises estimating resource requirement or demand of one or more entities in each base station according to feedback from the plurality of basestations, computing resource allocation for said one or more entities, and enforcing the computed resource allocation using basestation-level virtualization.

Another aspect of the present invention includes an apparatus used in a radio access network (RAN) sharing system including a plurality of basestations. The apparatus comprises an estimation unit to estimate resource requirement or demand of one or more entities in each base station according to feedback from the plurality of basestations, a computing unit to compute resource allocation for said one or more entities, and an enforcing unit to enforce the computed resource allocation using basestation-level virtualization.

Still another aspect of the present invention includes a method used in a radio access network (RAN) sharing system. The method comprises transmitting feedback from a plurality of basestations, and computing resource allocation for one or more entities in each of the plurality of basestations according to the feedback, wherein the feedback includes per-flow MCS (modulation and coding scheme) information.

DETAILED DESCRIPTION

NetShare is designed as a central solution that is deployed in a cellular gateway, e.g. a serving gateway in LTE (Long Term Evolution), or in an apparatus that is disposed between basestations and the cellular gateway. NetShare enables multiple entities to share the RAN of cellular networks such that they receive guaranteed resources.

NetShare optimally allocates wireless resources, for example, in the following steps:

(1) Based on the dynamic requirement for each entity at each basestation, NetShare optimally computes the resource allocation across all basestations for each entity. The allocation is computed, for example, such that it maximizes the overall revenue for the physical network owner.

(2) The formulated resource allocation problem may be infeasible due to many constraints across all entities and base stations. In this case, Netshare attempts to find a solution that only violates the individual upper bound and has minimum total violation. The solution has the least impact on the QoE (quality of experience) and SLA (service level agreement).

(3) NetShare leverages NVS [1] to enforce the computed allocation for each entity at every basestation. Here we chose NVS as an example, since it is a comprehensive basestation-level virtualization technique that provides downlink and uplink resource virtualization. Other systems can be utilized for this purpose.

NetShare allows a cellular network operator to share its network with other operators and virtual operators to save CAPEX/OPEX (capital expenditure/operational expenditure). NetShare also facilitates the operators to provide guaranteed resources for content providers and enterprises to improve QoE for their users generating additional revenue for the operator. NetShare can also improve the SLAs (service level agreements) for group-based data plans for the operator. NetShare allows sharing the resources on a group of basestations while allowing distributing the resources among the entities at each base station proportionally to the resource demand for each entity improving entities' resource utilization.

Figure 1:
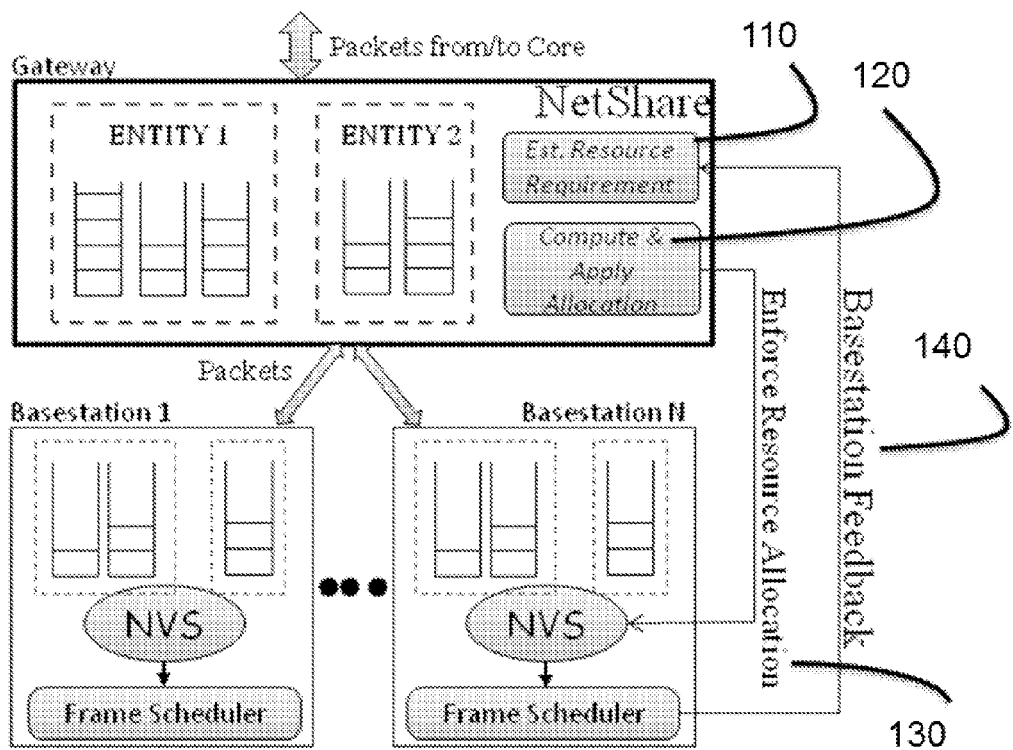
FIG. 1 depicts NetShare's software Architecture.

Referring to FIG. 1, NetShare includes an optimal resource allocation algorithm as identified by 120. NetShare may have three other novelties as identified by 110, 130 and 140.

Figure 2:
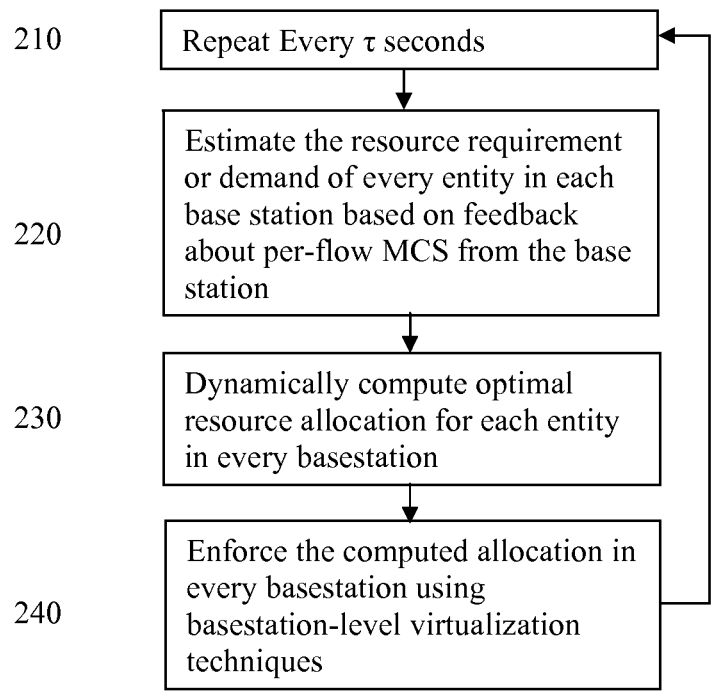
FIG. 2 depicts NetShare's operation.

Referring to FIG. 2, NetShare performs the following three operations (steps 220, 230, and 240) every τ seconds:

In step 220, to allocate resources to an entity proportional to its resource requirement or demand at every basestation, NetShare computes the demand for entity j (j=1, 2, ..., J) at basestation b (b=1, 2, ..., B) using:

$$d_j^b = \sum_{i \in Q_j^b} \frac{\min(\beta A_i, S_i)}{T \times R_i},$$

where $d_j^b$ is the resource requirement or demand, $Q_j^b$ is a set of flows that belong to entity j at basestation b, $A_i$ and $S_i$ are the arrival rate and maximum sustained rate, respectively, of flow i that belongs to entity j, β is a parameter, T is the total number of resource blocks in a base station in one second, and $R_i$ is the flow's MCS (modulation and coding scheme) that is obtained by feedback 140 from basestation. Netshare may set β>1 to ensure that it reacts to increase in resource demand of flows.

In step 230, to compute the optimal resource allocation, NetShare performs the following steps: First, we formulate the problem as a constrained convex optimization problem. Second, we obtain a basically feasible solution to the formulated problem. Third, we apply the phase-one method to find a feasible solution. If the problem is not feasible, return the solution with minimum violation. Otherwise, finally apply the barrier method to find the optimal solution.

In step 240, after NetShare computes the optimal allocation of wireless resources across basestations, it enforces these allocations on the different basestations using a basestation-level virtualization technology (e.g. NVS [1]).

To correctly estimate the resource requirement of an entity in a basestation, NetShare has to translate bandwidth requirement to resource requirement. To enable this, we define a feedback of per-flow MCS (Modulation and Coding Scheme) from the basestations to the gateway where we implement NetShare.

Figure 3:
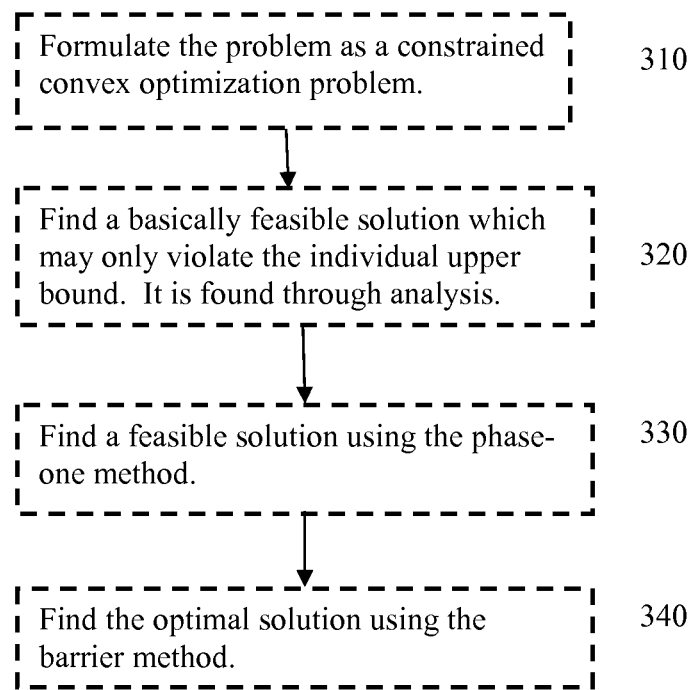
FIG. 3 depicts steps that NetShare performs to compute resource allocation.

Step 230 in FIG. 2 is further explained referring to FIG. 3, as follows:

In step 310, our formulation of the problem may includes objective function $g_j(t)$ which represents the total utility an entity gets when it receives aggregate t resources, and three sets of constraints. First, each entity has lower bound $L_j$ and upper bound $U_j$ on the aggregate resources it receives. Second, each basestation has total (normalized) resource less than or equal to 1. Third, the resource allocated to entity j at basestation b has individual upper bound $u_j^b$ and lower bound $l_j^b$. As an instance, individual lower bound $l_j^b = \alpha L_j/B$, where $0 < \alpha < 1$ and B is the number of basestations. Individual upper bound $u_j^b$ is chosen to be proportional to the resource demand estimated at step 220 in FIG. 2. However, our algorithm applies to arbitrarily-chosen bounds.

In step 310, our formulation of the problem may include maximizing $$\sum_{b=1}^{B} \sum_{j=1}^{J} G_{j,b}(t_j^b)$$

such that $$L_j \leq \sum_{b=1}^{B} t_j^b \leq U_j \text{ for all } j,$$

$$\sum_{j=1}^{J} t_j^b \leq f_r(b) \text{ for all } b, \text{ and}$$

$$l_j^b \leq t_j^b \leq u_j^b, \text{ for all } b, j,$$

where $t_j^b$ is resource allocation for entity j (j=1, 2, ..., J) at base station b (b=1, 2, ..., B), $G_{j,b}(t_j^b)$ is a utility function, $L_j$ and $U_j$ are lower and upper bounds on the aggregate resources, respectively, $l_j^b$ and $u_j^b$ are individual lower and upper bounds, respectively, and fr(b) represents normalized resources available at basestation b. $G_{j,b}(t_j^b)$ can be expressed as follows:

$$G_{j,b}(t_j^b) = d_j^b \times \log(t_j^b).$$

Alternatively, $G_{j,b}(t_j^b)$ may also be expressed as follows:

$$G_{j,b}(t_j^b) = d_j^b \times t_j^b.$$

In step 320, to solve the formulated problem, we first find a basically feasible solution which is one that may only violate the individual upper bound. The solution can obtained via analysis as follows:

$$t_j^b = t_j^b + (\delta_j + \eta_j) \cdot \frac{1 - \sum_j t_j^b}{B - \sum_{j,b} t_j^b},$$

where $t_j^b$ is resource allocation for entity j (j=1, 2, ..., J) at base station b (b=1, 2, ..., B), $$\delta_j = L_j - \sum_b t_j^b, \text{ and } 0 \le \eta_j \le \min\left(\left(B - \sum_j L_j\right) \bigg/ J, U_j - L_j\right).$$

The above solution assumes the following conditions are satisfied:

$U_j \ge L_j$      i)

$\sum_j L_j \le B$      ii)

$\sum_j t_j^b \le 1$      iii)

These constraints can be easily verified and if they are not satisfied, the parameters (e.g., the lower bounds and upper bounds) should be modified.

In step 330, the phase-one method starts from a basically feasible solution obtained in 320, and then applies the barrier method to solve Problem 2 described in the further system details A section. Problem 2 takes all the constraints from the originally formulated problem except replacing individual upper bound $u_j^b$ with $u_j^b + s_j^b$, where $s_j^b \ge 0$. The objective of Problem 2 is to minimize $$\sum_{b,j} s_j^b.$$

If the objective is 0, then we find a feasible solution to the original problem. Once a feasible solution is found, we return and continue to step 340. If the optimal value of Problem 2 is greater than 0, the original problem has no feasible solution and we return a solution with minimum total violations on the individual constraints.

In step 340, starting from the feasible solution developed in 330, we apply the barrier method to find the optimal solution of the formulated problem, where the barrier function is the log-function as described in the further system details sections.

Step 120 in FIG. 1 is described also as follows: (1) The problem formulation in step 310 in FIG. 3 as well as the lower bound and upper bound selection. (2) Find a basically feasible solution in step 320 in FIG. 3. This solution may only violate the individual upper bound. (3) When finding a feasible solution in step 330 in FIG. 3, we do not relax all constraints as done in a typical phase-one application. Instead, we only relax the individual upper bound while always making sure all other constraints are satisfied. So if the problem is infeasible, we will return a solution that only violates the individual upper bound and has the minimum sum violation. (4) Find the optimal solution using barrier method with log function as the barrier function.

Figure 4:
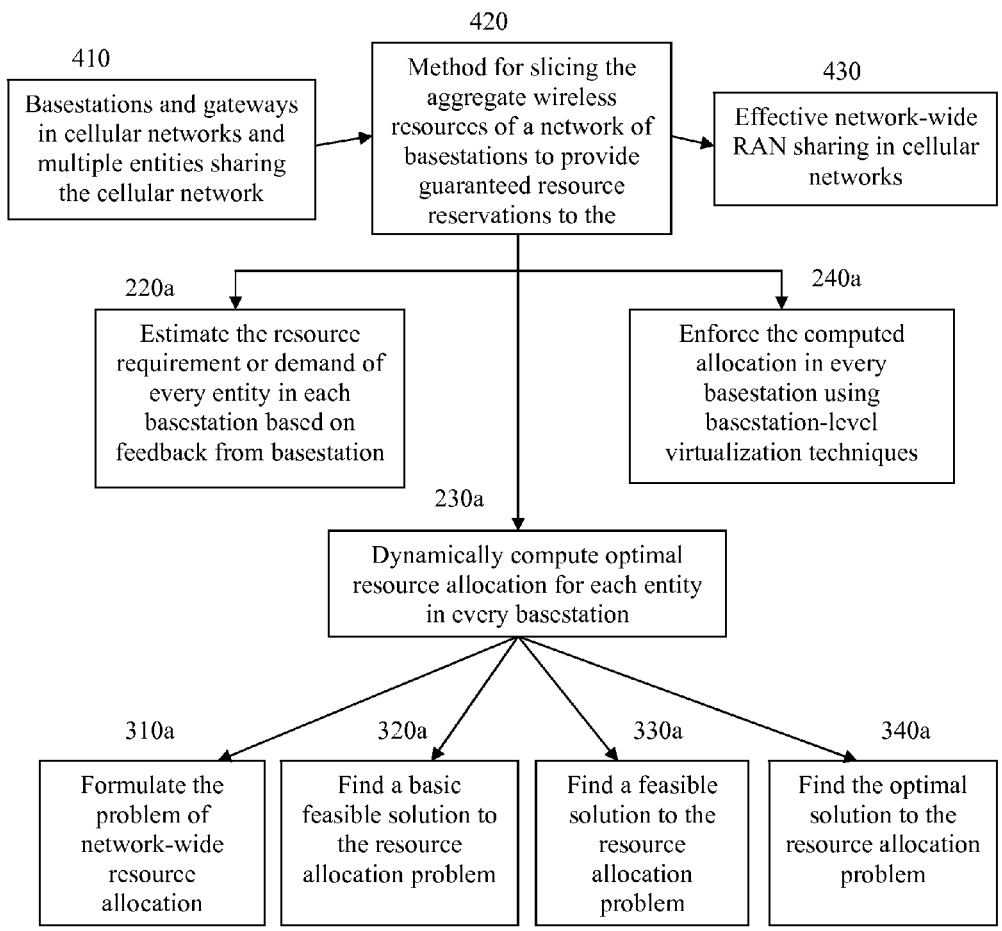
FIG. 4 depicts a high-level block and/or flow diagram of an aspect of NetShare.
Figure 5:
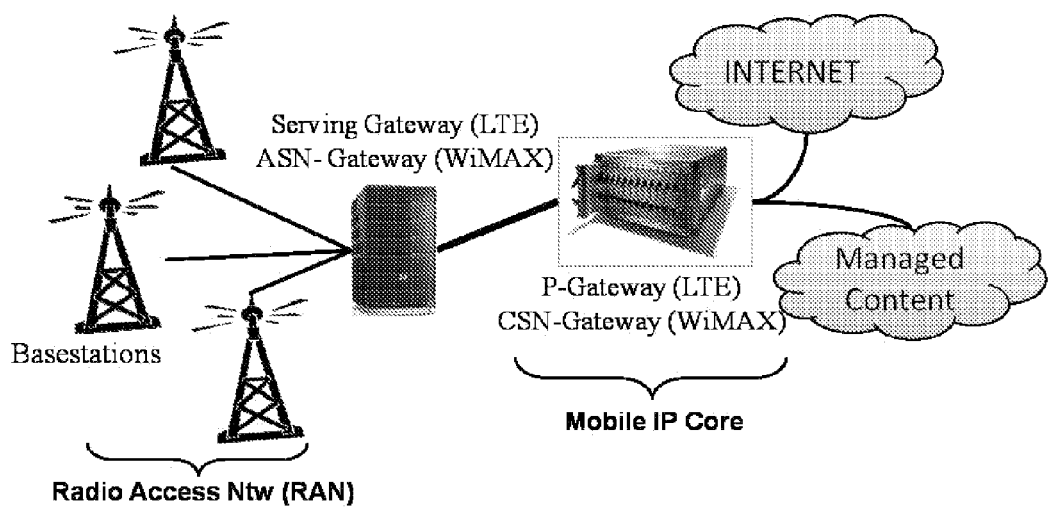
FIG. 5 depicts cellular network architecture.
Figure 6:
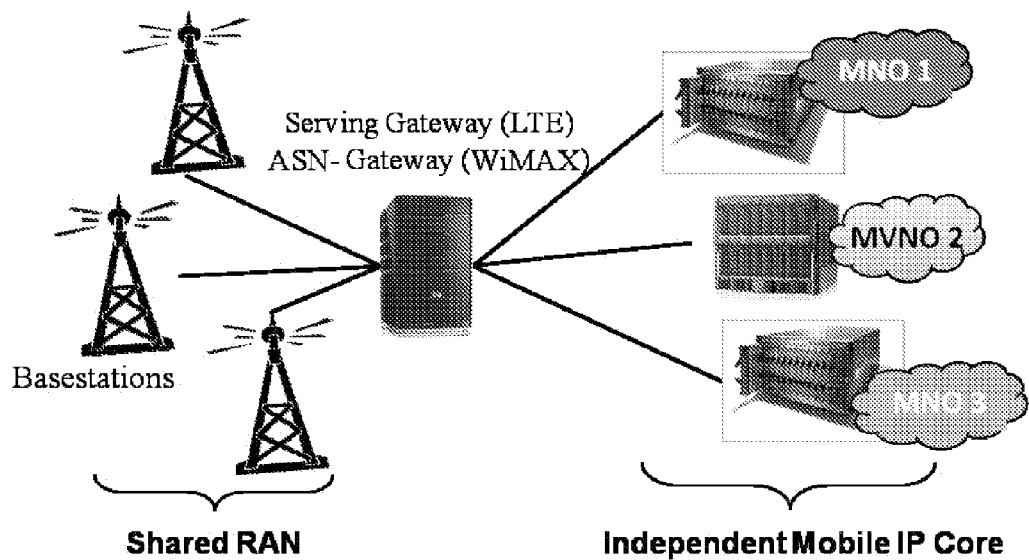
FIG. 6 depicts an MOCN (multi operator core network) RAN-sharing model.
Figure 7:
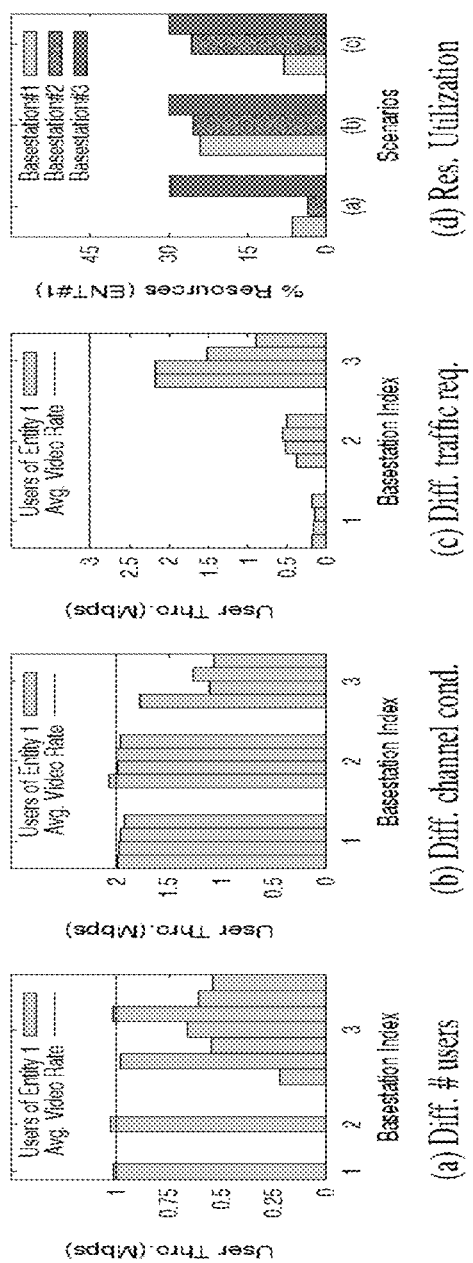
FIG. 7 depicts cases for NetShare.
Figure 8:
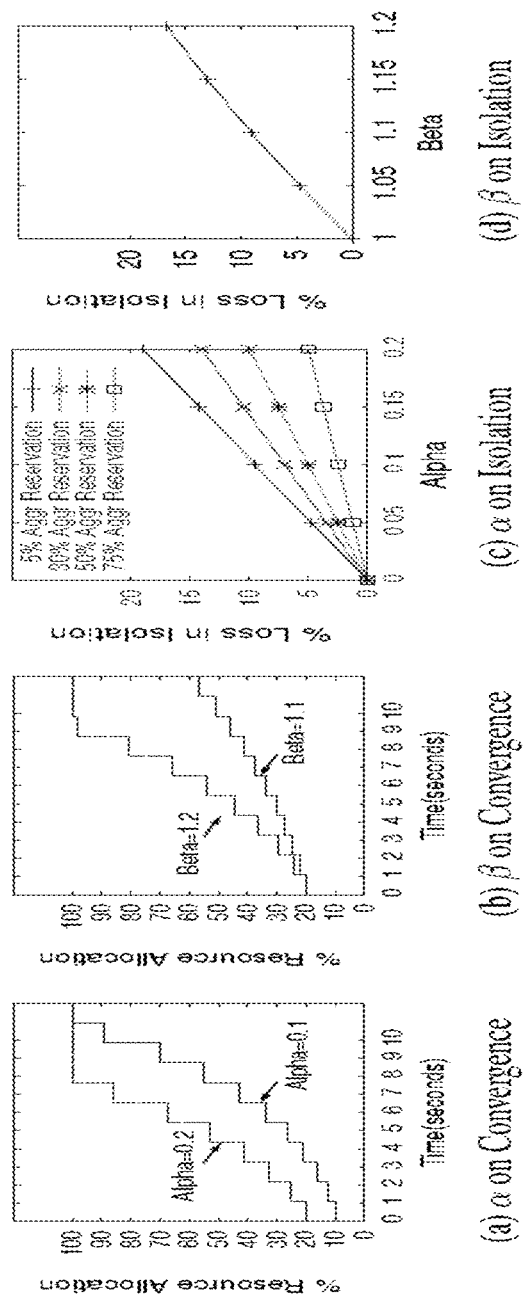
FIG. 8 depicts tradeoff analysis of $\alpha$ and $\beta$.
Figure 9:
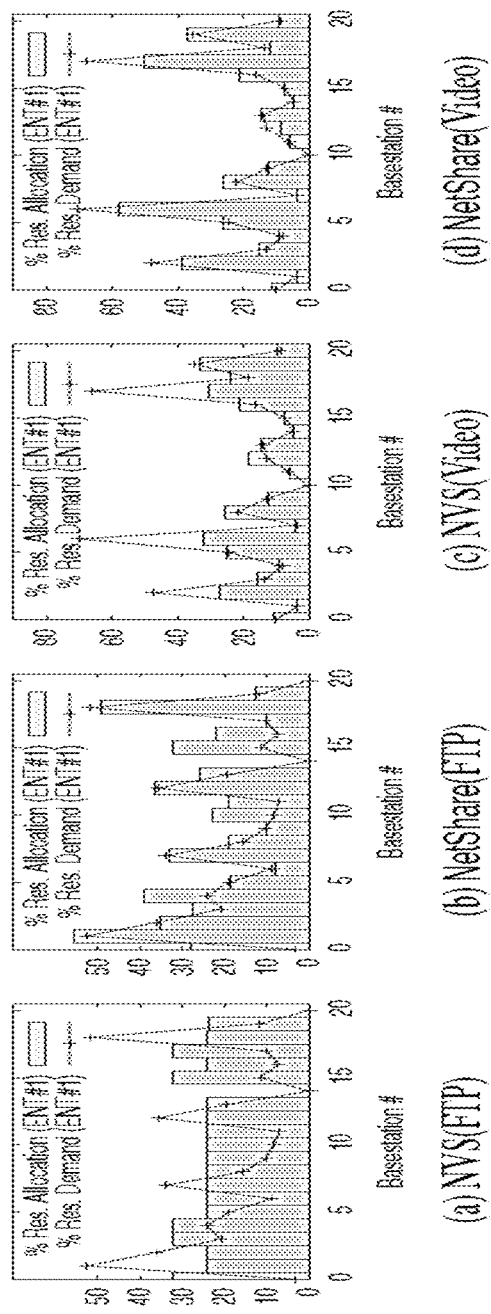
FIG. 9 depicts resource distribution with NetShare.
Figure 10:
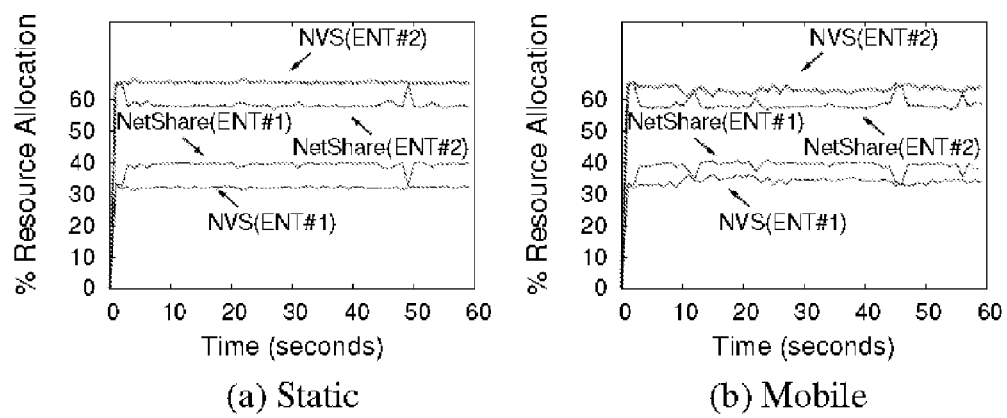
FIG. 10 depicts resource isolation with NetShare
Figure 11:
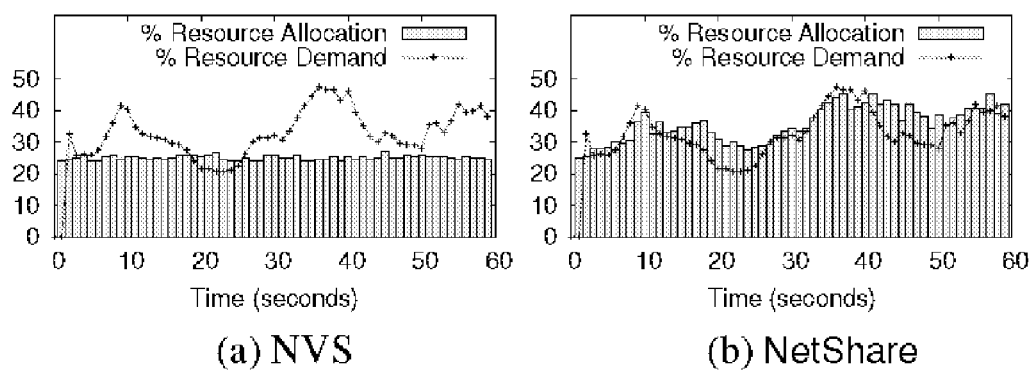
FIG. 11 depicts NetShare with user mobility (the demand and resource allocation of a single entity at a particular basestation over time with and without NetShare).
Figure 12:
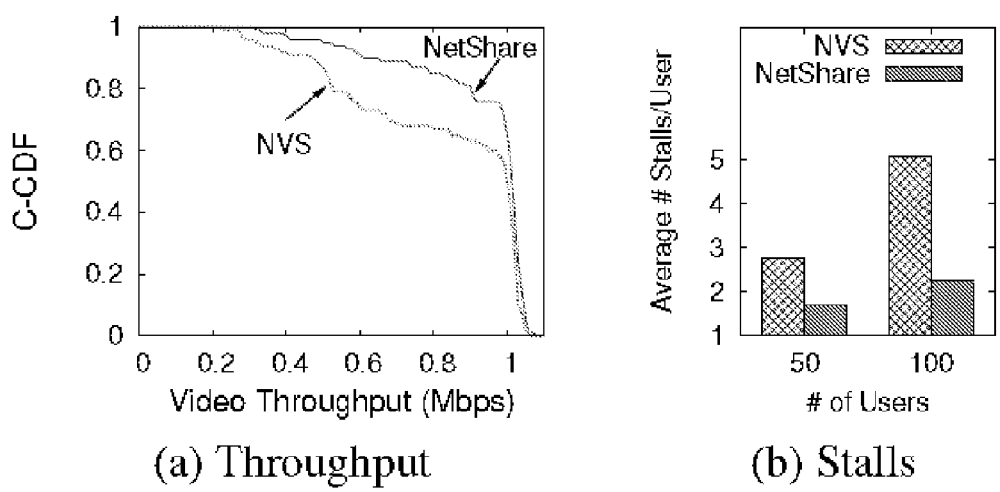
FIG. 12 depicts QoE (quality of experience) of users with NetShare.
Figure 13:
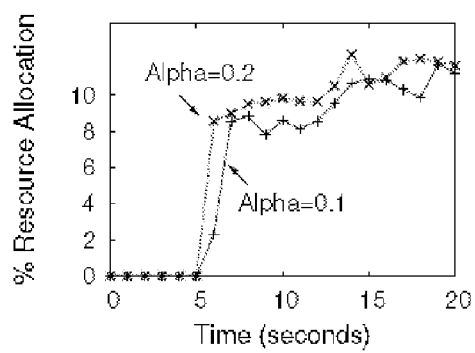
FIG. 13 depicts tradeoff with $\alpha$.
Figure 13:
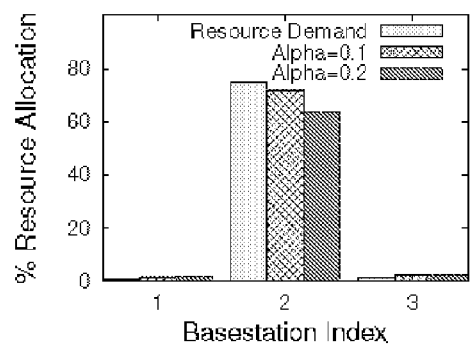
Figure 14:
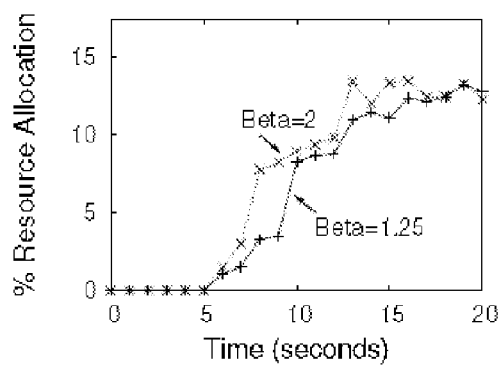
FIG. 14 depicts tradeoff with $\beta$.
Figure 14:
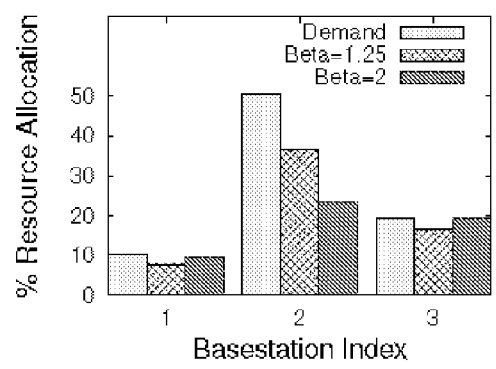
Figure 15:
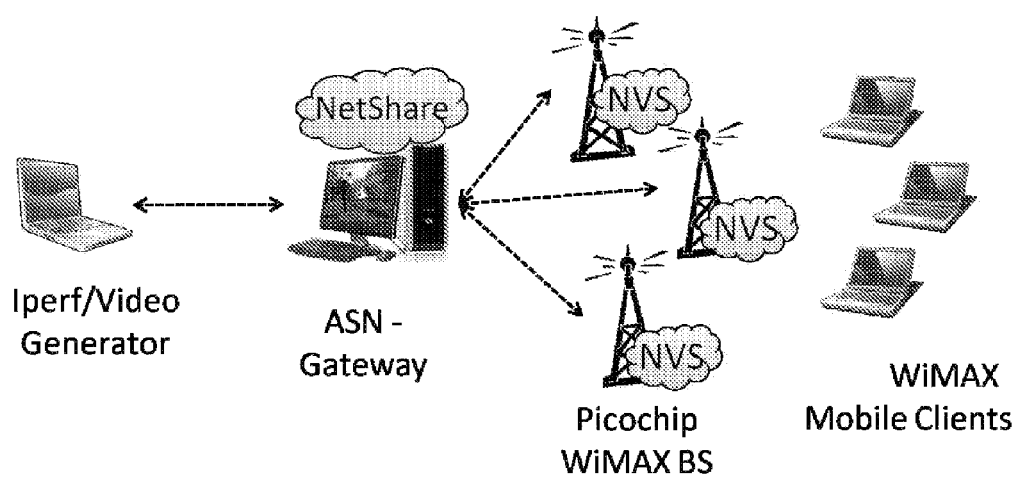
FIG. 15 depicts a NetShare WiMAX prototype.
Figure 16:
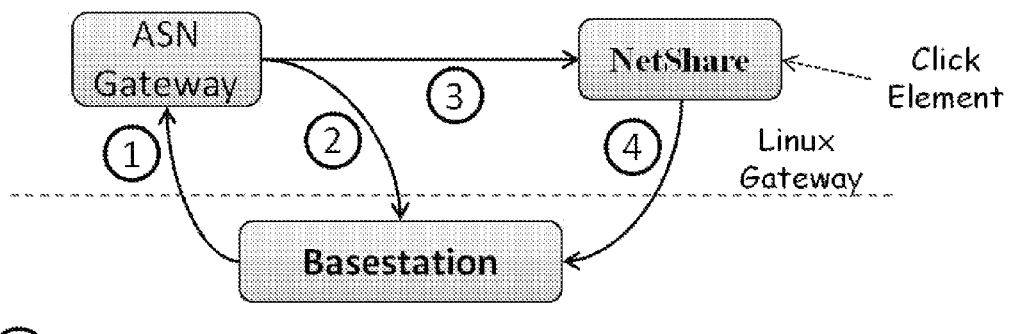
FIG. 16 depicts NetShare implementation details.
Figure 17:
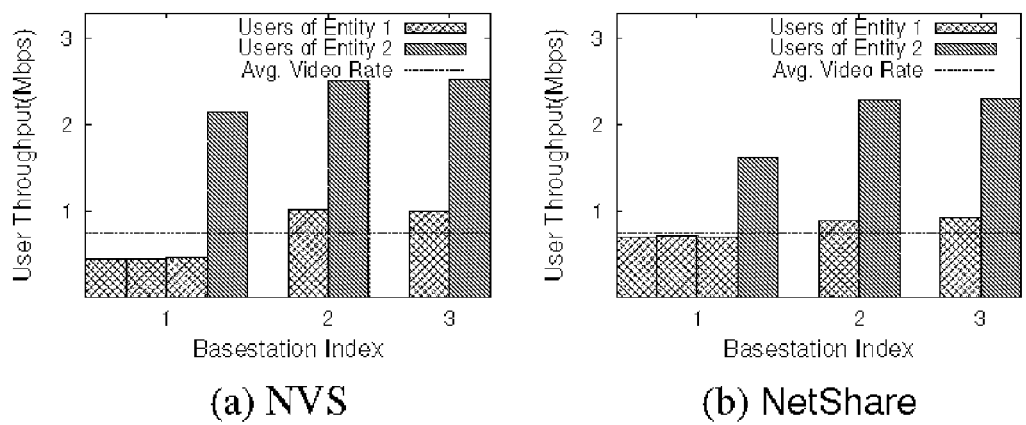
FIG. 17 depicts efficacy of NetShare.
Figure 18:
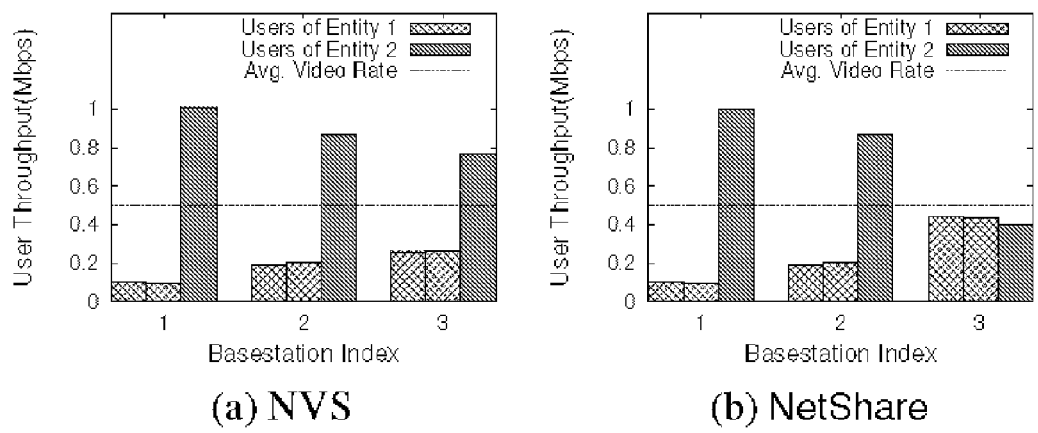
FIG. 18 depicts NetShare with uplink Traffic.
Figure 19:
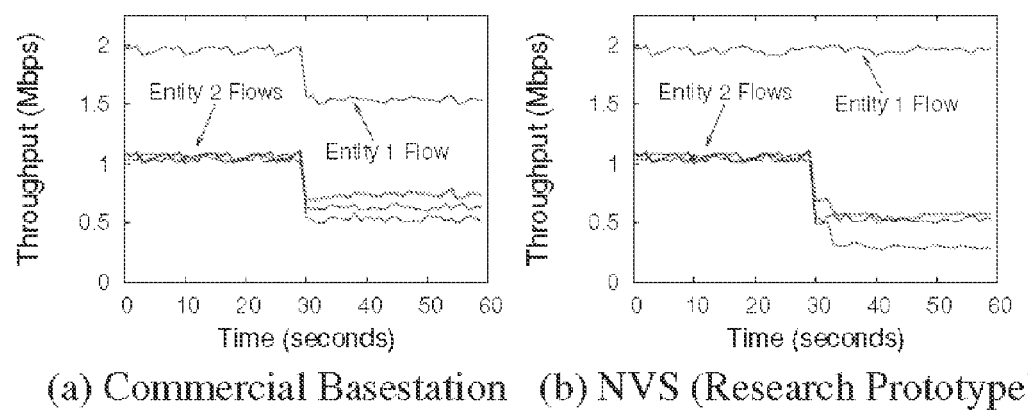
FIG. 19 depicts current basestation schedulers.
Figure 20:
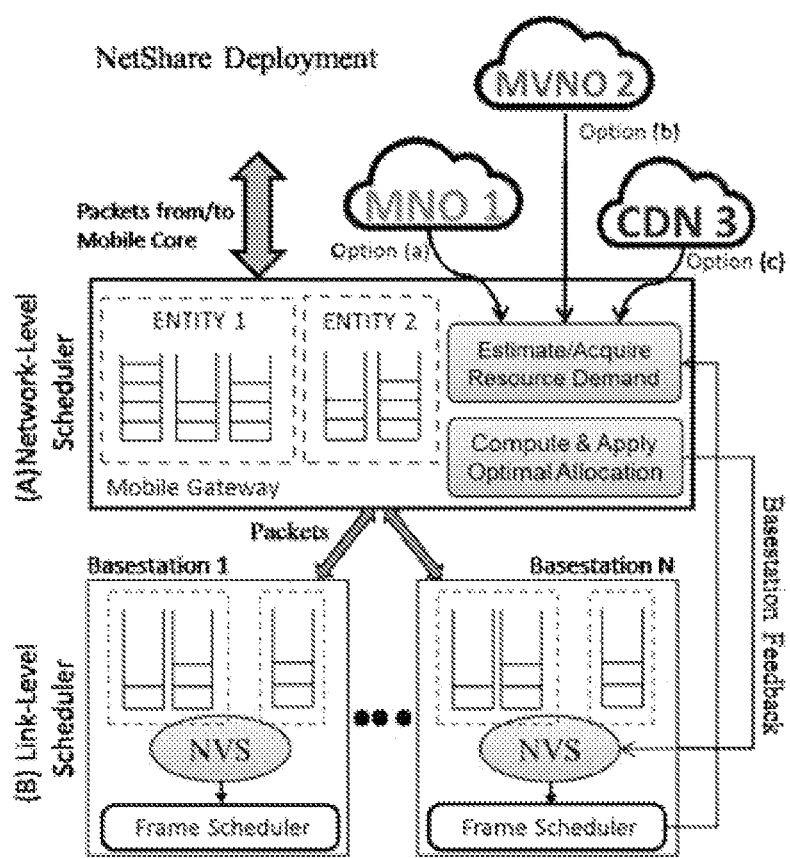
FIG. 20 depicts NetShare's software Architecture.
Figure 21:
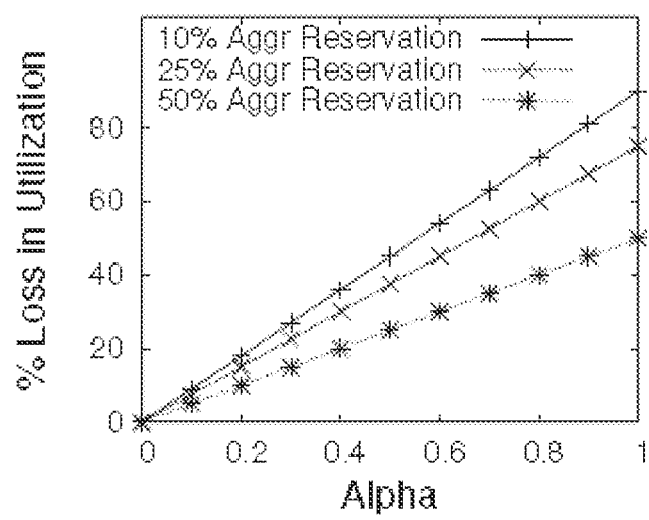
FIG. 21 depicts tradeoff with $1_j^b$.
Figure 22:
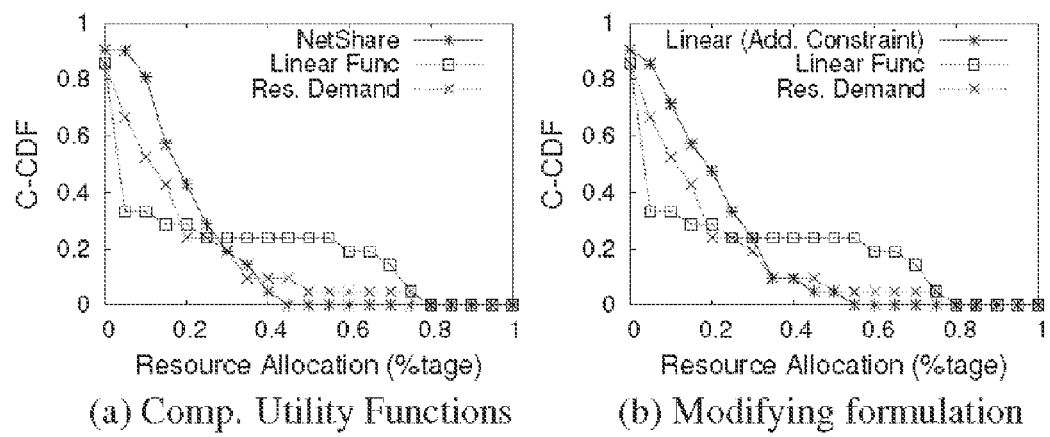
FIG. 22 depicts behavior of resource distribution.
Figure 23:
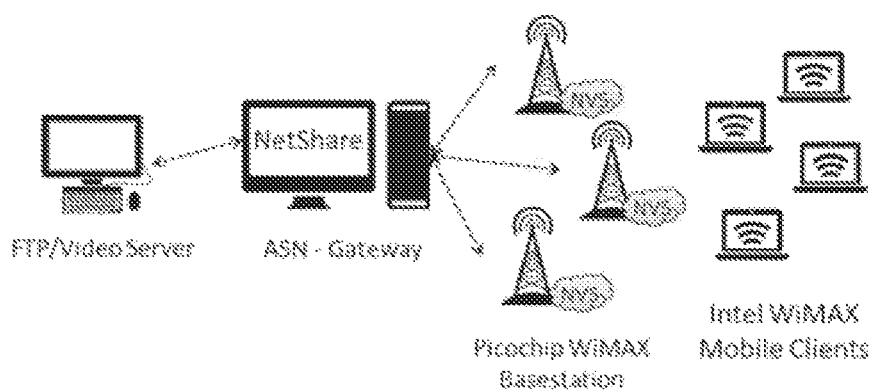
FIG. 23 depicts a NetShare WiMAX prototype.
Figure 24:
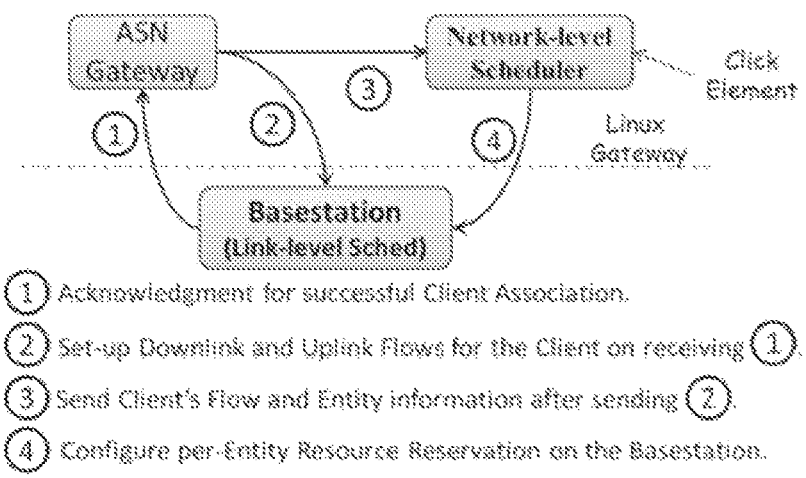
FIG. 24 depicts NetShare implementation details.
Figure 25:
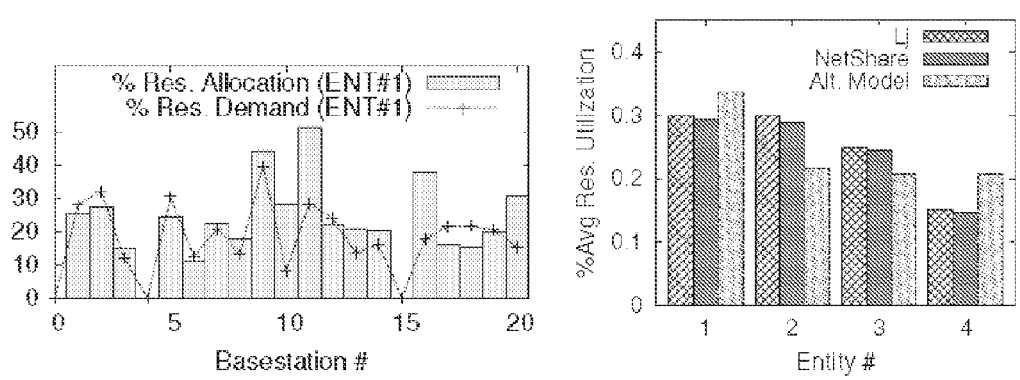
FIG. 25 depicts an alternate model.

Referring to FIG. 4, an aspect of NetShare is explained using a high-level block and/or flow diagram. In block 410, base stations and gateways are in a cellular network and multiple entities share the cellular network. In block 420, the aggregate wireless resources of a network of the basestations are sliced to provide guaranteed resource reservations to the entities. In block 430, effective network-wide RAN sharing is performed in a cellular network.

Blocks 220a, 230a, and 240a detail block 410. In block 220a, the resource requirement or demand of every entity in each basestation is estimated according to feedback from the basestations. In block 230a, optimal resource allocation for each entity in every basestation is dynamically computed. In block 240a, the computed allocation is enforced in every basestation using basestation-level virtualization techniques.

Blocks 310a, 320a, 330a, and 340a further detail block 230. In block 310a, the problem of network-wide resource allocation is formulated. In block 320a, a basic feasible solution to the resource allocation problem is found. In block 330a, a feasible solution to the resource allocation problem is found. In block 340a, the optimal solution to the resource allocation problem is found.

This invention formulates the problem of sharing the wireless resources of networked base stations, and adapting the barrier method to solve the problem. Steps 110, 130, and 140 in FIG. 1 may be used for executing this problem.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in an apparatus used in a radio access network (RAN) sharing system including a plurality of basestations, the method comprising:
    estimating resource requirement or demand of one or more entities in each base station according to feedback from the plurality of basestations;
    computing resource allocation for said one or more entities; and
    enforcing the computed resource allocation using basestation-level virtualization,
    wherein the estimation comprises:
        computing the resource requirement or demand for entity j at base station b using the following formula:

$$d_j^b = \sum_{i \in Q_j^b} \frac{\min(\beta A_i, S_i)}{T \times R_i},$$

where $d_j^b$ is the resource requirement or demand, $Q_j^b$ is a set of flows that belong to entity j at basestation b, $A_i$ and $S_i$ are the arrival rate and maximum sustained rate, respectively, of flow i that belongs to entity j, $\beta$ is a parameter, T is the total number of resource blocks in a base station in one second, and $R_i$ is the average number of bits per resource block derived from per-flow MCS information.

2. The method as in claim 1, wherein the resource allocation is computed dynamically or the method is performed periodically.

3. The method as in claim 1, wherein the feedback comprises per-flow MCS (modulation and coding scheme) information.

4. The method as in claim 1, wherein the computation comprises:
formulating a problem as a constrained convex optimization problem;
finding a basically feasible solution which violates an individual upper bound;
finding a feasible solution using a phase-one method; and
finding an optimal solution using a barrier method.

5. The method as in claim 4, wherein the formulation comprises:
using objective function $g_j(t)$ which represents the total utility each entity obtains when receiving aggregate t resources,
wherein each entity has lower bound $L_j$ and upper bound $U_j$ on the aggregate resources,
each basestation has total normalized resource less than or equal to 1, and
resource allocated to entity j (j=1, 2, ..., J) at basestation b (b=1, 2, ..., B) has individual upper bound $u^b_j$ and lower bound $l^b_j$.

6. The method as in claim 5,
wherein individual lower bound $l^b_j = \alpha L_j/B$, where $0 < \alpha < 1$, and
wherein individual upper bound $u^b_j$ is chosen to be proportional to the estimated resource requirement or demand.

7. The method as in claim 4, wherein the formulation comprises:
maximizing $$\sum_{b=1}^{B}\sum_{j=1}^{J} G_{j,b}(t^b_j)$$

such that $$L_j \le \sum_{b=1}^{B} t^b_j \le U_j \text{ for all } j,$$

$$\sum_{j=1}^{J} t^b_j \le f_r(b) \text{ for all } b, \text{ and}$$

$$l^b_j \le t^b_j \le u^b_j, \text{ for all } b, j,$$

where $t^b_j$ is resource allocation for entity j (j=1, 2, ..., J) at base station b (b=1, 2, ..., B), $G_{j,b}(t^b_j)$ is a utility function, $L_j$ and $U_j$ are lower and upper bounds on the aggregate resources, respectively, $l^b_j$ and $u^b_j$ are individual lower and upper bounds, respectively, and fr(b) represents normalized resources available at basestation b.

8. The method as in claim 7, wherein $G_{j,b}(t^b_j)$ is expressed as follows:

$G_{j,b}(t^b_j) = d^b_j \times \log(t^b_j)$.

9. The method as in claim 7, wherein $G_{j,b}(t^b_j)$ is expressed as follows:

$G_{j,b}(t^b_j) = d^b_j \times t^b_j$.

10. The method as in claim 4, wherein the basically feasible solution is obtained by using the following formula:

$$t^b_j = l^b_j + (\delta_j + \eta_j) \cdot \frac{1 - \sum_j l^b_j}{B - \sum_{j,b} l^b_j},$$

where $t^b_j$ is resource allocation for entity j (j=1, 2, ..., J) at base station b (b=1, 2, ..., B), $$\delta_j = L_j - \sum_b l^b_j, \text{ and } 0 \le \eta_j \le \min\left(\left(B - \sum_j L_j\right)/J, U_j - L_j\right).$$

11. The method as in claim 4, wherein the phase-one method comprises:
starting with the basically feasible solution;
replacing individual upper bound $u^b_j$ with $u^b_j + s^b_j$, where $s^b_j \ge 0$; and
minimizing $$\sum_{b,j} s^b_j.$$

12. The method as in claim 1, wherein the apparatus is in a cellular gateway or between the cellular gateway and one of the plurality of basestations.

13. An apparatus used in a radio access network (RAN) sharing system including a plurality of basestations, the apparatus comprising:
an estimation unit to estimate resource requirement or demand of one or more entities in each base station according to feedback from the plurality of basestations;
a computing unit to compute resource allocation for said one or more entities; and
an enforcing unit to enforce the computed resource allocation using basestation-level virtualization,
wherein the resource requirement or demand is computed for entity j at base station b using the following formula:

$$d^b_j = \sum_{i \in Q^b_j} \frac{\min(\beta A_i, S_i)}{T \times R_i},$$

where $d^b_j$ is the resource requirement or demand, $Q^b_j$ is a set of flows that belong to entity j at basestation b, $A_i$ and $S_i$ are the arrival rate and maximum sustained rate, respectively, of flow i that belongs to entity j, $\beta$ is a parameter, T is the total number of resource blocks in a base station in one second, and $R_i$ is the average number of bits per resource block derived from per-flow MCS information.

14. The apparatus as in claim 13, wherein the feedback comprises per-flow MCS (modulation and coding scheme) information.

15. The apparatus as in claim 13,
wherein, for the computation, the apparatus formulates a problem as a constrained convex optimization problem, finds a basically feasible solution which violates an individual upper bound, finds a feasible solution using a phase-one method, and finds an optimal solution using a barrier method.

16. The apparatus as in claim 13, wherein the apparatus is in a cellular gateway or between the cellular gateway and one of the plurality of basestations.

17. A method used in a radio access network (RAN) sharing system, the method comprising:
transmitting feedback from a plurality of basestations; and
computing resource allocation for one or more entities in each of the plurality of basestations according to the feedback,
wherein the feedback includes per-flow MCS (modulation and coding scheme) information,
wherein the computation comprises:
formulating a problem as a constrained convex optimization problem;
finding a basically feasible solution which violates an individual upper bound;
finding a feasible solution using a phase-one method; and
finding an optimal solution using a barrier method, and
wherein the formulation comprises:
using objective function $g_j(t)$ which represents the total utility each entity obtains when receiving aggregate t resources,
wherein each entity has lower bound $L_j$ and upper bound $U_j$ on the aggregate resources,
each basestation has total normalized resource less than or equal to 1, and
resource allocated to entity j (j=1, 2, ..., J) at basestation b (b=1, 2, ..., B) has individual upper bound $u^b_j$ and lower bound $l^b_j$.

18. The method as in claim 17, wherein the resource allocation is computed dynamically or periodically.

19. The method as in claim 17, wherein the apparatus is in a cellular gateway or between the cellular gateway and one of the plurality of basestations.

* * * * *